United States Patent
Cheon et al.

(10) Patent No.: US 10,092,896 B2
(45) Date of Patent: Oct. 9, 2018

(54) CATALYST FOR SELECTIVE CATALYTIC REDUCTION AND PREPARATION METHOD THEREFOR

(71) Applicants: Doosan Engine Co., Ltd., Gyeongsangnam-do (KR); Korea Institute of Science and Technology, Seoul (KR)

(72) Inventors: Jin Ho Cheon, Gyeongsangnam-do (KR); Kyung Ju Lee, Gyeongsangnam-do (KR); Sang Jin Kim, Gyeongsangnam-do (KR); Heon Pil Ha, Gyeonggi-do (KR)

(73) Assignees: Doosan Engine Co., Ltd., Gyeongsangnam-do (KR); Korea Institute of Science and Technology, Seoul (KR)

( * ) Notice: Subject to any disclaimer, the term of this patent is extended or adjusted under 35 U.S.C. 154(b) by 0 days.

(21) Appl. No.: 15/304,350

(22) PCT Filed: Jun. 30, 2014

(86) PCT No.: PCT/KR2014/005783
§ 371 (c)(1),
(2) Date: Oct. 14, 2016

(87) PCT Pub. No.: WO2015/160035
PCT Pub. Date: Oct. 22, 2015

(65) Prior Publication Data
US 2017/0043325 A1    Feb. 16, 2017

(30) Foreign Application Priority Data
Apr. 14, 2014 (KR) .................. 10-2014-0044116

(51) Int. Cl.
*B01J 27/053* (2006.01)
*B01J 37/08* (2006.01)
(Continued)

(52) U.S. Cl.
CPC ........ *B01J 27/053* (2013.01); *B01D 53/8628* (2013.01); *B01D 53/9418* (2013.01);
(Continued)

(58) Field of Classification Search
CPC .......... B01J 27/053; B01J 23/10; B01J 37/20
See application file for complete search history.

(56) References Cited

U.S. PATENT DOCUMENTS

| 4,855,115 A * | 8/1989 | Imanari ............ B01D 53/8628 |
| | | 423/239.1 |
| 2009/0143225 A1 | 6/2009 | Ha et al. |

(Continued)

FOREIGN PATENT DOCUMENTS

| CN | 102909003 A | 2/2013 |
| JP | S63147546 A | 6/1988 |

(Continued)

OTHER PUBLICATIONS

Wenqing, Xu, Deactivation of a Ce/TiO2 Catalyst by SO2 in the Selective Catalytic Reduction of NO by NH3, J. Phys. Chem. C. 2009, 113 (11), 4426-4432.
(Continued)

*Primary Examiner* — Douglas B Call
(74) *Attorney, Agent, or Firm* — Young Basile Hanlon & MacFarlane, P.C.

(57) ABSTRACT

A catalyst for selective catalytic reduction is described. Cerium (III) sulfate (cerous sulfate) is bound to a support. The catalyst also includes vanadium oxide and cerium oxide.

2 Claims, 5 Drawing Sheets

(51) Int. Cl.
*B01J 37/20* (2006.01)
*B01J 23/22* (2006.01)
*B01J 35/00* (2006.01)
*B01D 53/86* (2006.01)
*B01D 53/94* (2006.01)

(52) U.S. Cl.
CPC .............. *B01J 23/22* (2013.01); *B01J 35/002* (2013.01); *B01J 37/08* (2013.01); *B01J 37/20* (2013.01); *B01D 2255/2065* (2013.01); *B01D 2255/2098* (2013.01); *B01D 2255/20723* (2013.01)

(56) References Cited

U.S. PATENT DOCUMENTS

| | | | |
|---|---|---|---|
| 2010/0034717 A1* | 2/2010 | Adelmann | B01D 53/9418 423/213.2 |
| 2010/0209323 A1* | 8/2010 | Augustine | B01D 53/9418 423/239.1 |
| 2014/0100106 A1 | 4/2014 | Ha et al. | |
| 2014/0335004 A1 | 11/2014 | Ha et al. | |

FOREIGN PATENT DOCUMENTS

| | | |
|---|---|---|
| KR | 10-2000-013127 | 3/2000 |
| KR | 10-0671978 B1 | 1/2007 |
| KR | 10-2012-020688 | 3/2012 |
| KR | 10-1284214 B1 | 7/2013 |

OTHER PUBLICATIONS

Maqbool, Muhammad Salman et al, Novel Sulfation Effect on Low-Temperature Activity Enhancement of CeO2-added Sb-V2O5/TiO5 Catalyst for NH3-SCR, Applied Catalysis B: Environmental 152-153, (2014) 28-37.

Gu, T. et al., The enhanced performance of ceria with surface sulfation for selective catalytic reduction of NO by NH3, Catalysis Communications, NL, Elsevier, Nov. 2010, vol. 12, pp. 310-313.

Office Action in Japanese Patent Application No. 2016-562820 dated Jan. 16, 2018.

Office Action in Japanese Patent Application No. 2016-562820 dated Jun. 26, 2018 including English machine translation.

* cited by examiner

CATALYST FOR SELECTIVE CATALYTIC REDUCTION AND PREPARATION METHOD THEREFOR

TECHNICAL FIELD

The present disclosure relates to a catalyst for being applied to a selective catalytic reduction (SCR) method and a method for preparing the same.

BACKGROUND

Nitrogen oxides ($NO_x$) are generated from a moving source such as a ship or an automobile or a fixed source such as a power station or an incinerator. Since these nitrogen oxides have been pointed out as one of the main causes of polluting air by forming acid rain and smog, various methods for removing nitrogen oxides have been proposed.

Among them, examples of a method for removing nitrogen oxides emitted from fixed sources include a selective catalytic reduction for denitrifying nitrogen oxides by applying a titania-based catalyst composed of a support including titanium oxide and an active catalyst component including vanadium oxide in the presence of ammonia as a reducing agent.

SUMMARY

In these examples, however, since the titania-based catalyst has excellent denitrification efficiency at 300° C. or more, there is a problem in that a catalyst is provided at a position where the temperature of exhaust gases is 300° C. or more, or the temperature of exhaust gases needs to be artificially increased when a catalyst intends to be used at a low temperature of 300° C. or less.

Accordingly, methods for increasing the content of vanadium oxide, which is an active catalyst component, have been proposed in order to improve the low-temperature activity of a titania-based catalyst. But, as the content of vanadium oxide is increased, there occurs a problem in that a reaction in which sulfur dioxide ($SO_2$) included in exhaust gases is oxidized to sulfur trioxide ($SO_3$) is facilitated, and accordingly, the production of poisoning substances is increased. That is, the reaction in which sulfur dioxide ($SO_2$) is oxidized to sulfur trioxide ($SO_3$) is facilitated, and the oxidized sulfur trioxide reacts with ammonia as a reducing agent to produce ammonium bisulfate ($NH_4HSO_4$) as a poisoning substance.

Therefore, there is a need for a catalyst having excellent activity at low temperature and capable of minimizing production of poisoning substances.

In order to solve the aforementioned problem, the present disclosure has been made in an effort to provide a catalyst having excellent activity at low temperature and capable of minimizing production of poisoning substances, and a method for preparing the catalyst.

The catalyst described herein includes a support to which cerium (III) sulfate (cerous sulfate) is bound. It also includes vanadium oxide and cerium oxide.

Here, the catalyst may further include antimony oxide.

Further, when the catalyst denitrifies nitrogen oxides at 220 to 300° C. in the presence of a reducing agent, the catalyst may have a denitrification efficiency of 90% or more.

The present disclosure also describes a method for preparing a catalyst, the method including: a) preparing a raw material catalyst including a support, vanadium oxide, and cerium oxide; b) heating the raw material catalyst to a temperature of 350 to 600° C.; and c) treating the heated raw material catalyst with sulfur dioxide ($SO_2$) to form cerium (III) sulfate on the support.

Here, in Step c), a concentration of sulfur dioxide at which the catalyst is treated may be 50 to 1,000 ppm.

Here, the raw material catalyst may further include antimony oxide.

DETAILED DESCRIPTION

1. Catalyst

A catalyst of the present disclosure includes a support, vanadium oxide, and cerium oxide, and will be specifically described as follows.

The support included in the catalyst of the present disclosure supports vanadium oxide as a catalyst active component. A material that may be used as the support is not particularly limited, but examples thereof include titanium oxide ($TiO_2$), zirconium oxide ($ZrO_2$), silicon dioxide ($SiO_2$), tin dioxide ($SnO_2$), alumina and composites thereof, and the like, and among them, titanium oxide ($TiO_2$) is preferred.

Cerium (III) sulfate (cerous sulfate) is bound to the support, and accordingly, the catalyst of the present disclosure including the same has excellent activity not only at a high temperature, but also at a low temperature, and the excellent activity will be described below. The cerium (III) sulfate is a salt to which a trivalent cerium ion ($Ce^{3+}$) is bound, and is classified as a material different from cerium (IV) sulfate (ceric sulfate) to which a tetravalent cerium ion ($Ce^{4+}$) is bound.

The vanadium oxide included in the catalyst of the present disclosure is a catalyst active component. The vanadium oxides may be embodied as vanadium pentoxide ($V_2O_5$), vanadium dioxide ($VO_2$), vanadium trioxide ($V_2O_3$), or vanadium monoxide (VO), and among them, the vanadium oxide included in the catalyst of the present disclosure is usually vanadium pentoxide.

The cerium oxide included in the catalyst of the present disclosure is a cocatalyst which enhances the activity of the vanadium oxide which is a catalyst active component. Cerium oxides may be embodied as cerium (III) oxide ($Ce_2O_3$), or cerium (IV) oxide ($CeO_2$), and the cerium oxide included in the catalyst of the present disclosure is the cerium (III) oxide and/or the cerium (IV) oxide.

This catalyst of the present disclosure includes a support to which cerium (III) sulfate is bound, and thus has excellent activity not only at a high temperature, but also at a low temperature, and the excellent activity will be described with reference to FIG. 1 as follows.

Figure 1:
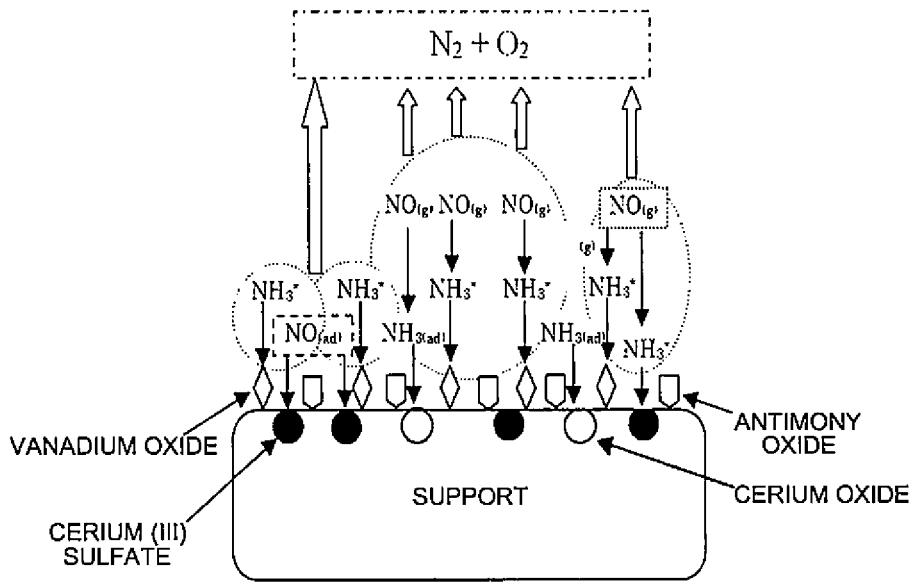
FIG. 1 illustrates a process of denitrifying nitrogen oxides by a catalyst according to the present disclosure.

FIG. 1 schematically illustrates the process of denitrifying the nitrogen oxide by the catalyst of the present disclosure, which includes a support to which cerium (III) sulfate is bound. When cerium (III) sulfate is bound to the surface of a support as in the catalyst of the present disclosure, a denitrification rate (reduction rate) of nitrogen oxides at a low temperature may be increased as the activity of the catalyst is enhanced due to an increase in reaction acid sites of the catalyst. Further, cerium (III) sulfate bound to the surface of the support may suppress a poisoning substance ammonium bisulfate from being adsorbed, thereby minimizing the poisoning of the catalyst. In the present disclosure, the reaction acid site of the catalyst may be defined as a site where a reducing agent adsorbed on the surface of the catalyst reacts with nitrogen oxides to remove the nitrogen oxides.

Meanwhile, the catalyst of the present disclosure may further include antimony oxide as a cocatalyst in consideration of the activity of the catalyst. Antimony oxides may be embodied as antimony trioxide ($Sb_2O_3$), antimony tetroxide ($Sb_2O_4$), or antimony pentoxide ($Sb_2O_5$), and among them, the antimony oxide included in the catalyst of the present disclosure is usually antimony trioxide ($Sb_2O_3$).

This catalyst of the present disclosure may exhibit a denitrification efficiency of 90% or more when denitrifying nitrogen oxides at a low temperature, preferably 220 to 300° C., and more preferably 225 to 250° C. in the presence of a reducing agent (for example, ammonia).

2. Method for Preparing Catalyst

In order to prepare the catalyst of the present disclosure described above, first, a raw material catalyst including a support, vanadium oxide, and cerium oxide is prepared. In this case, it is preferred that antimony oxide is further included in the raw material catalyst.

Next, the prepared raw material catalyst is heated to a temperature of 350 to 600° C. Specifically, it is preferred that the raw material catalyst is heated to a temperature of 400 to 500° C., and the heating method is not particularly limited as long as the method is publicly known in the art.

Finally, the heated raw material catalyst is treated with sulfur dioxide ($SO_2$) to form cerium (III) sulfate on the surface of the support. That is, cerium (IV) oxide among the cerium oxides is reacted with sulfur dioxide to form cerium (III) sulfate. A reaction of forming the cerium (III) sulfate may be expressed as the following reaction formula.

$$2CeO_2 + 3SO_2 + O_2 \rightarrow Ce_2(SO_4)_3 \qquad \text{Reaction Formula}$$

Here, when the heated raw material catalyst is treated with sulfur dioxide ($SO_2$), the concentration of sulfur dioxide ($SO_2$) at which the raw material catalyst is treated is not particularly limited. However, a preferred technique includes that the raw material catalyst is treated with sulfur dioxide ($SO_2$) at 50 to 100 ppm such that the formation of cerium (III) sulfate is facilitated.

As described above, the catalyst of the present disclosure is prepared by a simple method for treating a raw material catalyst with sulfur dioxide ($SO_2$) to modify the surface of the raw material catalyst. Therefore, when a catalyst is prepared by the preparation method of the present disclosure, it is possible to economically provide a catalyst having an excellent denitrification rate of nitrogen oxides not only at a high temperature, but also at a low temperature.

Hereinafter, the present disclosure will be described in detail through Examples, but the following Examples and Experimental Examples only exemplify one form of the present disclosure, and the scope of the present disclosure is not limited by the following Examples and Experimental Examples.

Example 1

A catalyst was prepared by heating a raw material catalyst, which is composed of 86 wt % of titanium oxide (support), 2 wt % of vanadium oxide (catalyst active component), 2 wt % of antimony oxide (cocatalyst), and 10 wt % of cerium oxide (cocatalyst), to 400° C. (10° C./min) under the air atmosphere. Then, the raw material catalyst was treated with sulfur dioxide at 500 ppm for 1 hour.

Example 2

A catalyst was prepared in the same manner as in Example 1, except that the raw material catalyst was warmed to 500° C. before being treated with sulfur dioxide.

Comparative Example 1

The raw material catalyst in Example 1 was applied as it was.

Comparative Example 2

A catalyst was prepared in the same manner as in Example 1, except that the raw material catalyst was warmed to 180° C. before being treated with sulfur dioxide.

Comparative Example 3

A catalyst was prepared in the same manner as in Example 1, except that the raw material catalyst was warmed to 300° C. before being treated with sulfur dioxide.

Experimental Example 1: Analysis of X-Ray Absorption Near Edge Structure (XANES) of Catalyst The beam line at the Pohang Accelerator Laboratory was used to absorb X-ray on the surfaces of the catalysts prepared in Examples 1 and 2 and Comparative Examples 1 to 3 and measure the electron shift movement variation (3d→4f orbital shift) of the surfaces. The total electron yield was obtained and is shown in FIG. 2.

Figure 2:
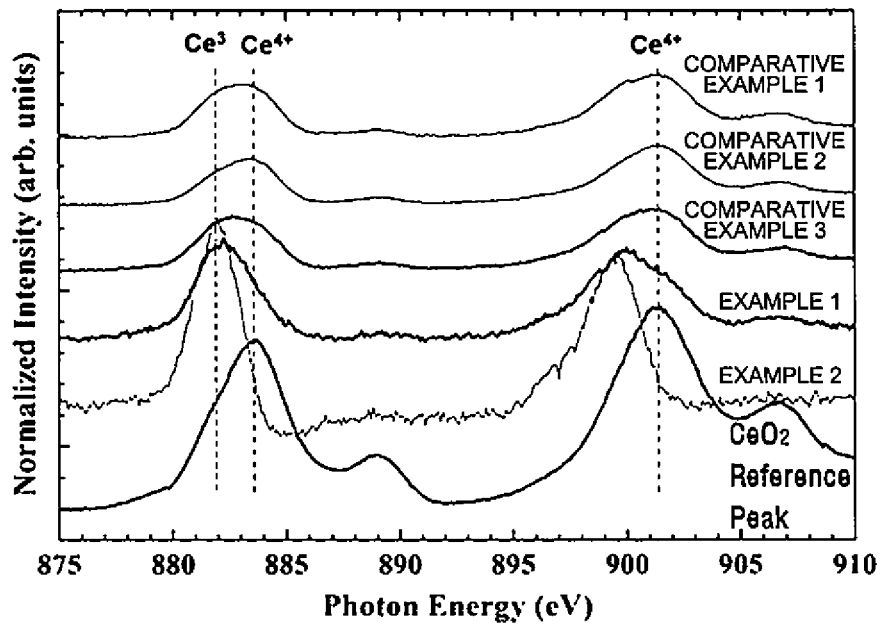
FIGS. 2 to 8 illustrate the results according to Experimental Examples of the present disclosure.

Referring to FIG. 2, it can be confirmed that for the catalysts in Examples 1 and 2 according to the present disclosure, the peak shift occurred from $Ce^{4+}$ to $Ce^{3+}$. It was concluded that the peak shift occurred because, as the catalyst was treated with sulfur dioxide, cerium (III) sulfate was formed on the surfaces of the catalysts in Examples 1 and 2, and that, as a result, the amount of $Ce^{3+}$ was increased.

Meanwhile, for the catalyst of Comparative Example 1, which was not treated with sulfur dioxide, and the catalysts of Comparative Examples 2 and 3, which were heated to 180° C. and 300° C., and then treated with sulfur dioxide, the peak shift did not occur. From the results, it can be seen that the catalyst temperature before the catalyst is treated with sulfur dioxide acts as an important factor in forming cerium (III) sulfate.

Experimental Example 2: $Ce^{3+}$ XPS Analysis of Catalyst

Figure 3:
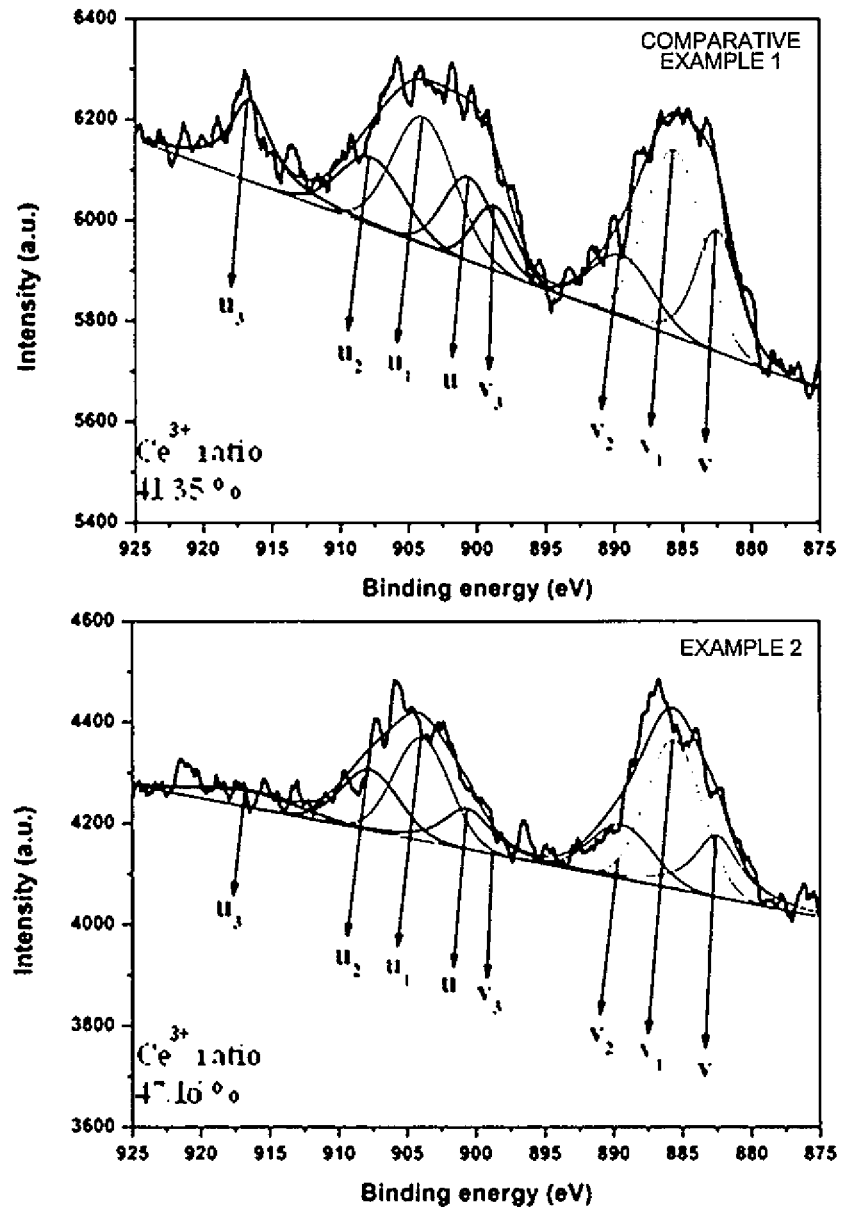

The $Ce^{3+}$ ratios of the catalysts prepared in Example 2 and Comparative Example 1 were measured by using X-ray photoelectron spectroscopy (PHI 5800 ESCA), and the results are shown in FIG. 3.

Referring to FIG. 3, it can be confirmed that the catalyst ($Ce^{3+}$ ratio: 47.16%) in Example 2 according to the present disclosure has a higher $Ce^{3+}$ ratio than the catalyst ($Ce^{3+}$ ratio: 41.35%) in Comparative Example 1. This result appears to be because, as the catalyst was treated with sulfur dioxide, cerium (III) sulfate was formed on the surface of the catalyst in Example 2, increasing the amount of $Ce^{3+}$.

Figure 4:
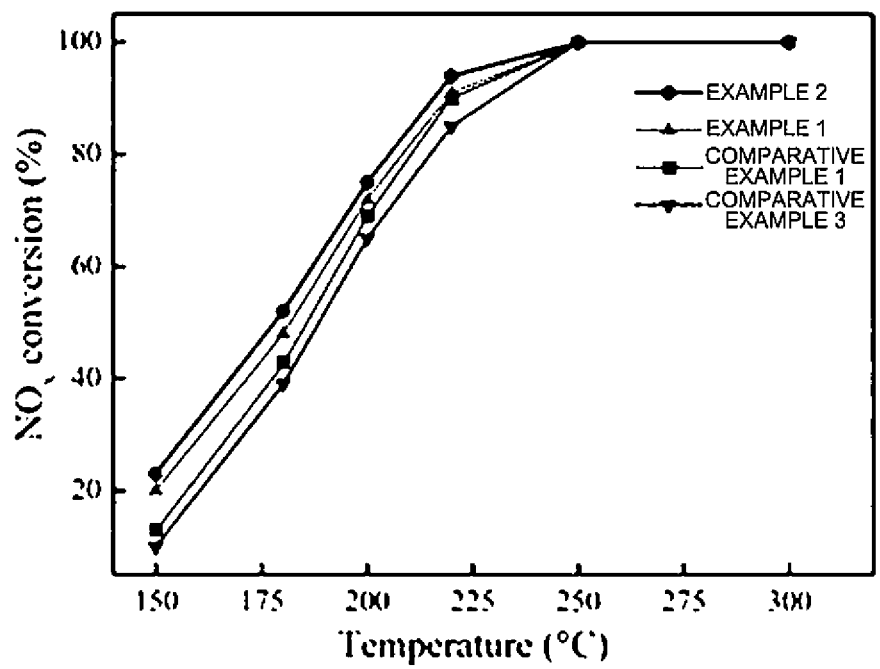

Experimental Example 3: Measurement 1 of Denitrification Rate of Nitrogen Oxides The catalysts prepared in Examples 1 and 2 and Comparative Examples 1 and 3 were each loaded into a fixed-bed catalytic reactor, the denitrification rates of the catalysts depending on the temperature were measured by a gas analyzer. The results are shown in FIG. 4. In this case, the denitrification reaction conditions were as follows.
Reducing agent: $NH_3$ 800 ppm
Concentration of nitrogen oxides ($NO_x$): 800 ppm
Injection concentration of sulfur dioxide ($SO_2$): 500 ppm,
Injection of 3 vol % of oxygen ($O_2$) and 6 vol % of water ($H_2O$)
Space Velocity (SV): 60,000 $h^{-1}$
Referring to FIG. 4, it can be confirmed that the catalysts in Examples 1 and 2 according to the present disclosure had a better denitrification rate than those of the catalysts in Comparative Examples 1 and 3 at a low temperature (specifically 150 to 250° C.).

Figure 5:
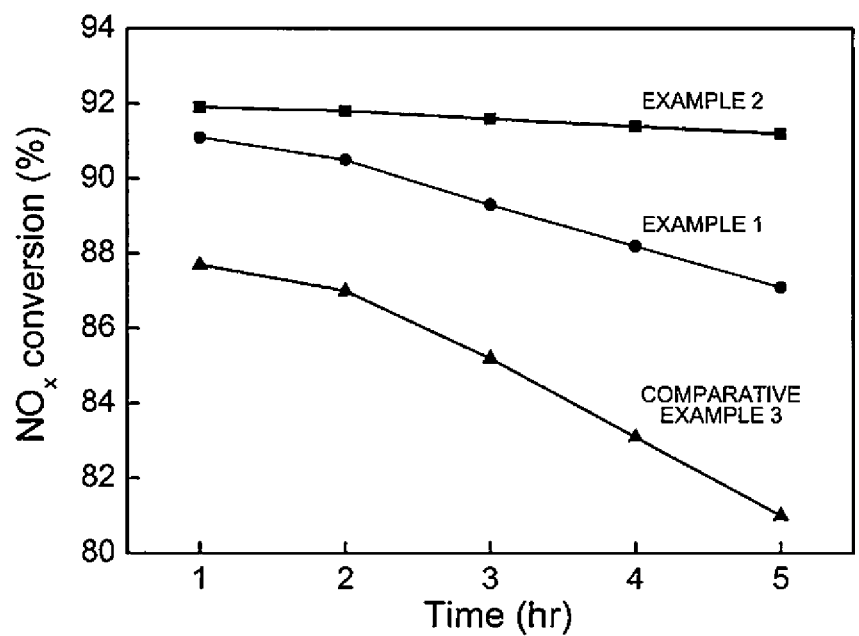

Experimental Example 4: Measurement 2 of Denitrification Rate of Nitrogen Oxides The catalysts prepared in Examples 1 and 2 and Comparative Example 3 were each loaded into a fixed-bed catalytic reactor, the denitrification rates of the catalysts at 225° C. over time were measured by a gas analyzer. The results are shown in FIG. 5. In this case, the denitrification reaction conditions were as follows.
Reducing agent: $NH_3$ 800 ppm
Concentration of Nitrogen Oxides ($NO_x$): 800 ppm
Injection concentration of sulfur dioxide ($SO_2$): 500 ppm,
Injection of 3 vol % of oxygen ($O_2$) and 6 vol % of water ($H_2O$)
Space Velocity (SV): 60,000 $h^{-1}$
Referring to FIG. 5, it can be seen that the catalysts in Examples 1 and 2 according to the present disclosure had a smaller decrease in denitrification rate of the catalyst over time than the catalyst in Comparative Example 3. The result supports a conclusion that, from the catalysts in Examples 1 and 2, production of poisoning substances was minimized compared to the catalyst in Comparative Example 3. As a result, the lifetime thereof is expected to improve.

Experimental Example 5: $NH_3$ Analysis of Catalyst

Figure 6:
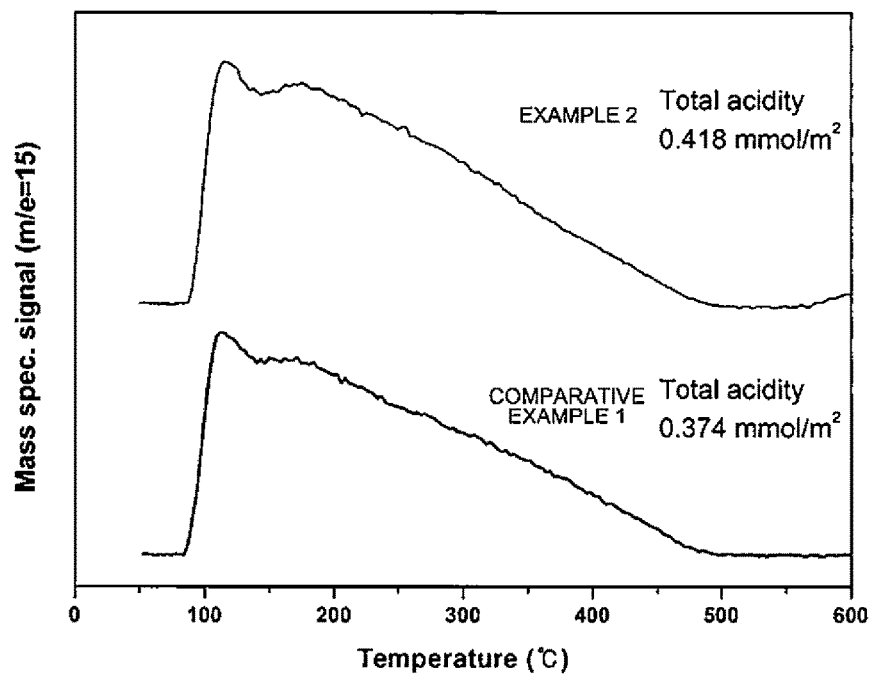

The catalysts prepared in Example 2 and Comparative Example 1 were each loaded into a TPD (Temperature Programmed Desorption) reactor, an $NH_3$ gas was injected into the reactors at normal temperature for 1 hour to adsorb $NH_3$ on the surfaces of the catalysts. Then the catalysts were purged to analyze the amount of $NH_3$ desorbed depending on the temperature by means of a Mass analyzer. The results are shown in FIG. 6.
Referring to FIG. 6, it can be seen that the catalyst in Example 2 according to the present disclosure had a higher amount of $NH_3$ desorbed than the catalyst in Comparative Example 1. It was concluded from this result that the catalyst in Example 2 had a higher amount of $NH_3$ adsorbed due to an increase in acid sites than that in Comparative Example 1, and the increase in amount of $NH_3$ adsorbed resulted in an effect of improving the denitrification rate.

Experimental Example 6: NO Analysis of Catalyst

Figure 7:
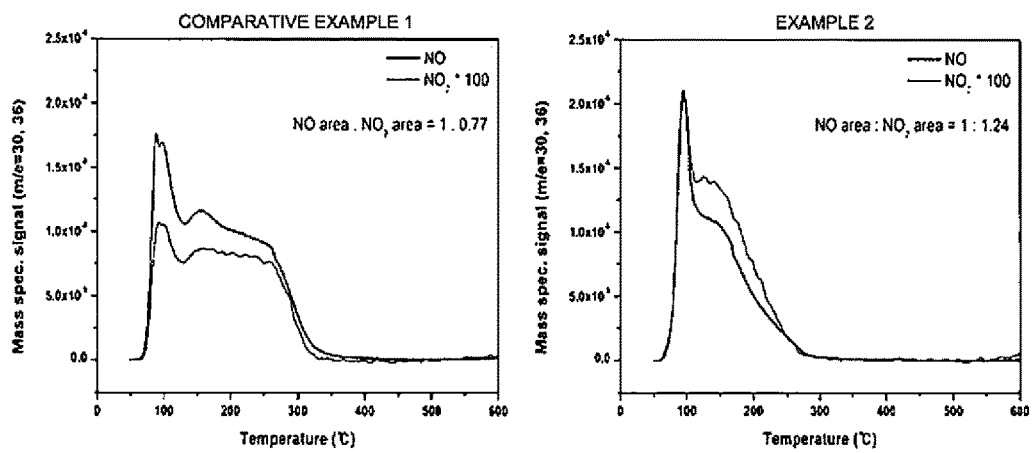

The catalysts prepared in Example 2 and Comparative Example 1 were each loaded into a TPD (Temperature Programmed Desorption) reactor, an NO gas was injected into the reactors at normal temperature for 1 hour to adsorb NO on the surfaces of the catalysts. Then, the catalysts were purged to analyze the amount of NO desorbed and the amount of NO adsorbed in the catalyst to be oxidized into $NO_2$ depending on the temperature by means of a Mass analyzer. The results are shown in FIG. 7.
Referring to FIG. 7, it can be confirmed that the catalyst in Example 2 according to the present disclosure had a higher ratio of $NO_2$ than the catalyst in Comparative Example 1. The increase in ratio of $NO_2$ leads to an effect of improving the denitrification rate.

Experimental Example 7: FT-IR Analysis of Catalyst

Figure 8:
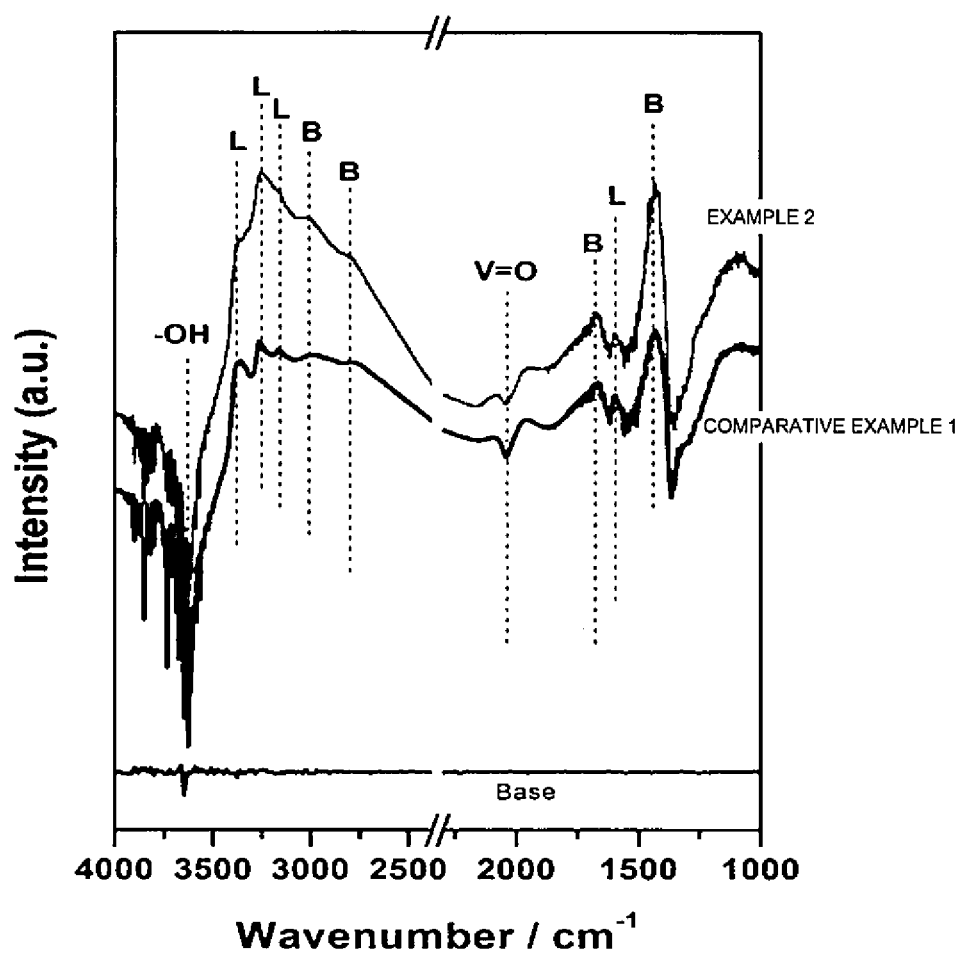

A diffuse reflectance infrared Fourier transform spectroscopy (DRIFTS) was filled with the catalysts in Example 2 and Comparative Example 1, respectively, and then $NH_3$ was injected into the spectroscopy to analyze reaction acid sites (BrØnsted and Lewis acid sites) on the surfaces of the catalysts. The results are shown in FIG. 8.
Referring to FIG. 8, it can be confirmed that the catalyst in Example 2 according to the present disclosure had a more increased amount of reaction acid sites than the catalyst in Comparative Example 1. It is concluded that this result is because the amount of the reaction acid sites on the surface of the catalyst was increased by $Ce^{3+}$ of cerium (III) sulfate bound to the catalyst surface (specifically, support surface) in Example 2.

The catalyst according to the present disclosure has excellent catalytic activity at a low temperature because cerium (III) sulfate is bound to a support. Therefore, when nitrogen oxides are decomposed by applying the catalyst of the present disclosure, excellent denitrification efficiency may be obtained not only at a high temperature, but also at a low temperature. Further, production of poisoning substances may also be minimized.

The invention claimed is:
1. A method for preparing a catalyst, the method consisting of:
    a) preparing a raw material catalyst, the raw material catalyst consisting essentially of a support material, vanadium oxide, antimony oxide, and cerium oxide, wherein the cerium oxide is cerium (IV) oxide, or a mixture of cerium (III) oxide and cerium (IV) oxide;
    b) heating the raw material catalyst to a temperature of 350 to 600° C. under air atmosphere; and
    c) treating the heated raw material catalyst with sulfur dioxide ($SO_2$) to form cerium (III) sulfate on the surface of the support by reacting the cerium (IV) oxide of the heated raw material catalyst with the sulfur dioxide ($SO_2$) and $O_2$.
2. The method as claimed in claim 1, wherein in Step c), a concentration of sulfur dioxide at which the catalyst is treated is 50 to 1,000 ppm.

* * * * *